July 1, 1952  K. J. BUSSE  2,601,959
LINE DRYING AND STORAGE REEL
Filed Jan. 17, 1950
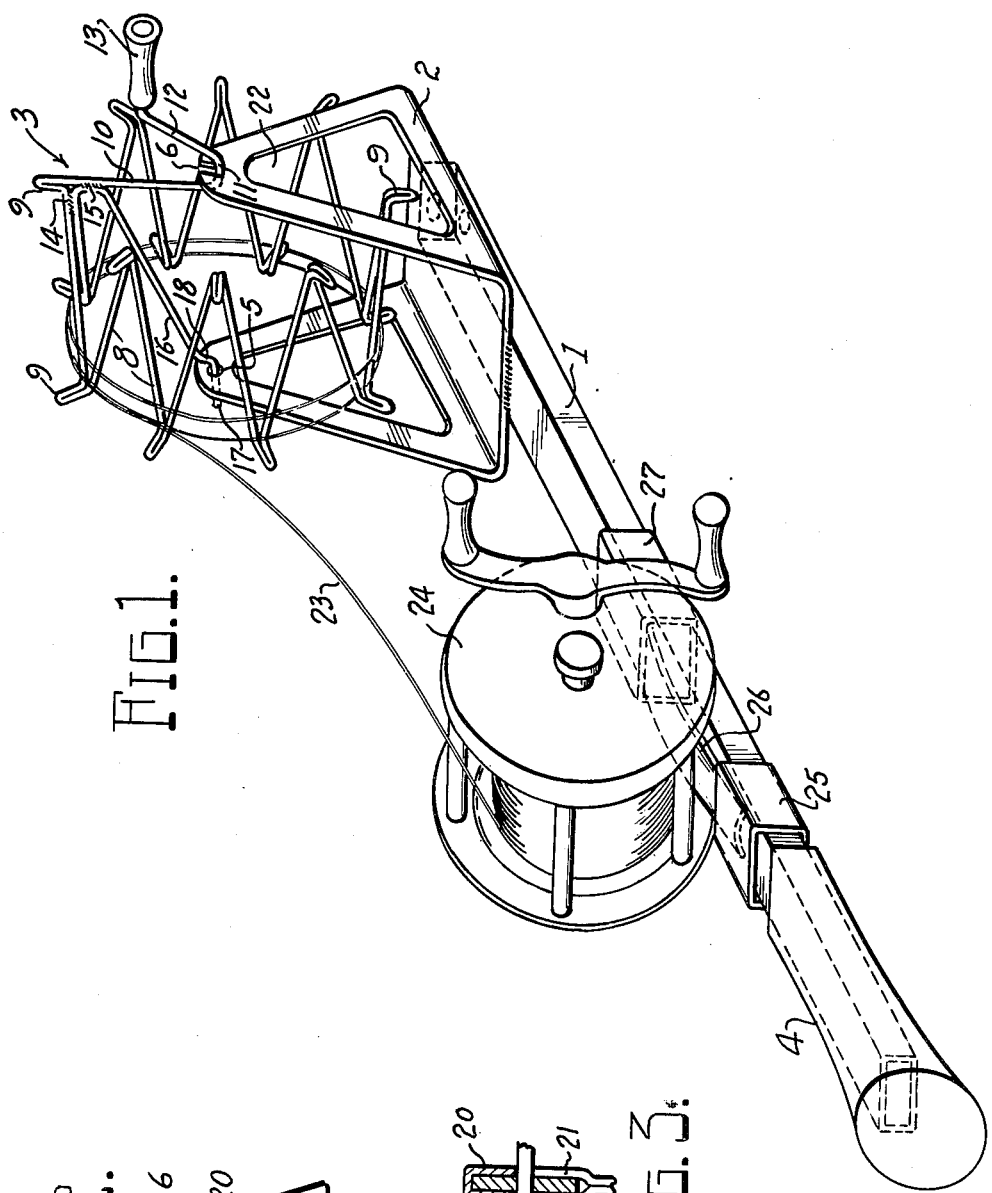
INVENTOR.
Karl J. Busse
BY Owen & Owen
ATTORNEYS Patented July 1, 1952

2,601,959

UNITED STATES PATENT OFFICE 2,601,959

LINE DRYING AND STORAGE REEL

Karl J. Busse, Tiffin, Ohio

Application January 17, 1950, Serial No. 139,075

1 Claim. (Cl. 242—104)

This invention relates to reels, and particularly to a reel especially adapted for holding a wet line, such as a fish line, for drying or storage.

In the use of fish lines, it is important to unreel and hang them up for drying after fishing, and preferably in a manner to maintain the line under substantially the same light tension when both wet and dry. In this connection, a line when wound wet on a reel expands when drying and thus leaves the line loose on the reel and presents an undesirable condition.

An object of this invention is the provision of a reel having a radially yieldable periphery on which a wet line may we wound under slight tension and preferably in open form for drying, and which will expand with the line convolutions as they dry so that the convolutions of the dry line continue under sufficient tension to prevent looseness or sagging on the reel.

Another object of the invention is the provision of a simple and efficient open or skeleton form of reel of the character described having its periphery formed of a plurality of circumferentially spaced cross-bars that are radially yieldable under inward stress and which return to normal expanded positions when relieved of such stress.

Other objects and advantages of the invention will be apparent from the following detailed description, and from the accompanying drawings illustrating one embodiment thereof, in which—

Fig. 1 is a perspective view of a device embodying the invention, with a fishing reel attached thereto and with its line being transferred to a drying and storage reel embodying the principal feature of the invention, and Figs. 2 and 3 are enlarged fragmentary details of a mounting means for the drying reel.

Referring to the drawings, 1 designates a bar or handle member having mounted thereon at one end a U-shaped frame 2 in which a rotary reel member 3 embodying the principal feature of the invention is mounted.

The bar 1, in the present instance, is of tubular form and rectangular in cross-section to provide a flat surface on which the reel mounting frame 2 may be fixedly mounted by electric welding or in any other suitable manner. This bar, if desired, may be provided at its free or handle end with a hand-grip 4.

The reel mounting frame 2 is preferably formed from sheet metal and has its base or loop portion resting on and attached to the bar with its legs of triangular form and projecting in parallel relation outwardly from its base. The apex portions of the frame legs are provided one with an aperture 5 and the other with a vertically disposed notch 6 for receiving bearing trunnions of the reel 3, as hereinafter described.

The reel or rotary member 3, for the purpose of cheapness and simplicity of construction, is preferably composed of a single piece of wire having at least a small degree of spring and bent to form at the reel periphery a plurality of circumferentially spaced cross-bars 8 that are radially contractable under pressure to reduce the reel diameter. In the present instance, the cross-bars 8 are successively connected at their ends one to another with the bars successively diverging on an incline from each other and connected at their respective adjacent ends by outturned or radially disposed loops 9 forming lugs to serve as confining means for a line being wound on the reel.

One terminal end of the wire extends inwardly from a loop 9 to form a spoke 10, and the inner end of this spoke is bent outwardly to form a trunnion 11 for mounting, in the present instance, in the bearing notch 6 of the frame 2. The wire at the outer end of this trunnion may be continued to form the crank 12, which for ease of turning may have its handle portion provided with a rotatable hand-grip 13. The first cross-bar 8 of the set extends from the loop 9 at the outer end of the spoke 10 and the last cross-bar of the set has an end terminating adjacent to said spoke loop 9 in side abutment with the starting end of said first bar, as shown at 14, then turns radially inward as at 15 a short distance in side contact with the outer end portion of the spoke 10, and then extends diagonally inward across the interior of the reel to form the spoke portion 16 with its end terminating in the trunnion 17 in axial register with the trunnion 11. The trunnion 17 is intended to be received by the bearing aperture 5 and is preferably connected to the part 16 by an offset 18 which forms a stop for the insertion of the trunnion into the bearing. The terminal cross-bars 8 of the set at their point 14 of side abutment are welded or otherwise rigidly secured together, as are also the spoke 10 and the inturned portion 15.

It is apparent that the only mounting means for the cross-bars 8 are the two spoke portions 10 and 16 and that those have direct connection with one of such bars. The cross-bars thus are free to have relative inward and outward springing movements to contract and expand the diametrical size of the reel. Therefore, if a line in winding on the reel causes contraction of its size, and for any reason after winding expands in length, the reel will readily expand to compensate for the line expansion and maintain substantially the original tightness of the line on the reel.

The trunnion 11 may be retained in the bearing notch 6 by a clip 20 that may have straddling coaction with the upper end of the associated frame leg and have its legs notched, as at 21, to straddle the trunnion. The free ends of the clip legs may be bent within an opening 22 in the frame lug to prevent accidental withdrawal of the clip therefrom.

In order to facilitate transfer of a line 23 from a fish pole reel 24 to the drying and storage reel 3, or vice versa, the former is removed from the fish pole and mounted on the bar 1 in the same manner as on the fish pole, or in any other suitable manner. In the present instance, a fixed band 25 on the bar 1 forms a socket at the top side of the bar for receiving one end of the reel shoe 26 while the other end is engaged by a slip band 27 on the bar. If the transfer is from the regular reel to the reel 3, the crank 12 is turned to rotate the reel 3 and the line is wound preferably in open or spaced manner thereon to permit air to freely circulate therethrough to facilitate drying. The line is also wound on the reel under slight tension so that the cross-bars 8 forming the reel periphery are sprung inward to slightly reduce the reel diameter. As the line lengthens by expansion during drying, the reel expands to compensate therefor, thus maintaining the line at approximately the same tautness at all times.

I wish it understood that my invention is not limited to any specific construction, arrangement or form of the parts, as it is capable of numerous modifications and changes without departing from the spirit of the claim.

Having thus described my invention, what I claim as new, and desire to secure by United States Letters Patent, is:

A line drying and storage reel comprising a single wire bent to form successive forward and backward portions in circular arrangement to cooperate to form the reel periphery, with the terminal end portions of the wire extending inward to form spokes with trunnions at their inner ends, said periphery being contractable from normal position by a line winding pressure thereon, said terminal end portions being fixedly connected at their inner ends and one extending substantially radially of the reel and the other extending diagonally to the reel center from one end to the other.

KARL J. BUSSE.

REFERENCES CITED

The following references are of record in the file of this patent:

UNITED STATES PATENTS

| Number | Name | Date |
|---|---|---|
| 542,564 | Koerner | July 9, 1895 |
| 1,286,085 | Peters | Nov. 26, 1918 |
| 2,192,111 | Vlaszac | Feb. 27, 1940 |

FOREIGN PATENTS

| Number | Country | Date |
|---|---|---|
| 455,875 | Great Britain | Oct. 29, 1936 |